United States Patent
Joshi et al.

(10) Patent No.: US 12,111,170 B1
(45) Date of Patent: Oct. 8, 2024

(54) MODEL-BASED ROUTING FOR AUTONOMOUS VEHICLES

(71) Applicant: Waymo LLC, Mountain View, CA (US)

(72) Inventors: Ajay Joshi, Mountain View, CA (US); Joshua Herbach, Mountain View, CA (US); Igor Tufanov, Mountain View, CA (US); Xiang Gao, Mountain View, CA (US); Dietmar Ebner, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 817 days.

(21) Appl. No.: 16/436,165

(22) Filed: Jun. 10, 2019

(51) Int. Cl.
 *G01C 21/34* (2006.01)
 *G05D 1/00* (2006.01)
 *G08G 1/16* (2006.01)

(52) U.S. Cl.
 CPC ....... *G01C 21/3492* (2013.01); *G05D 1/0061* (2013.01); *G05D 1/0088* (2013.01); *G05D 1/0217* (2013.01); *G08G 1/167* (2013.01)

(58) Field of Classification Search
 CPC .................. G01C 21/3492; G01C 21/3407; G01C 21/26; G01C 21/3453; G01C 21/3461; G05D 1/0061; G05D 1/0088; B62D 15/0255
 See application file for complete search history.

(56) References Cited

U.S. PATENT DOCUMENTS

| | | | |
|---|---|---|---|
| 9,188,985 B1 | 11/2015 | Hobbs et al. | |
| 9,557,183 B1 | 1/2017 | Ross et al. | |
| 9,939,284 B2 | 4/2018 | Meuleau | |
| 2008/0059015 A1 | 3/2008 | Whittaker et al. | |
| 2010/0256835 A1 | 10/2010 | Mudalige | |
| 2011/0060496 A1 | 3/2011 | Nielsen et al. | |
| 2011/0224893 A1 | 9/2011 | Scofield et al. | |
| 2013/0179057 A1* | 7/2013 | Fisher | G01C 21/3469 701/1 |
| 2015/0066355 A1* | 3/2015 | Siegel | G01C 21/3492 701/410 |

(Continued)

FOREIGN PATENT DOCUMENTS

JP 2012083892 A 4/2012

OTHER PUBLICATIONS

Wikipedia, Binary decision, Sep. 14, 2016 (Year: 2016).*

*Primary Examiner* — Matthew J. Reda
(74) *Attorney, Agent, or Firm* — Botos Churchill IP Law

(57) ABSTRACT

Aspects of the disclosure provide for the selection of a route for a vehicle having an autonomous driving mode. For instance, an initial location of the vehicle may be identified. This location may be used to determine a set of possible routes to a destination location. A cost for each route of the plurality is determined by inputting time of day information, map information, and details of that route into one or more models in order to determine whether the vehicle is likely to be stranded along that route and assessing the cost based at least in part on the determination of whether the vehicle is likely to be stranded along that route. One of the routes of the set of possible routes may be selected based on any determined costs. The vehicle may be controlled in the autonomous driving mode using the selected one.

22 Claims, 7 Drawing Sheets

(56) References Cited

U.S. PATENT DOCUMENTS

| | | |
|---|---|---|
| 2015/0142207 A1* | 5/2015 | Flehmig ............. G01C 21/3492 |
| | | 701/1 |
| 2015/0345967 A1 | 12/2015 | Meuleau |
| 2016/0025505 A1 | 1/2016 | Oh et al. |
| 2016/0144867 A1* | 5/2016 | Delp ............... B60W 30/18109 |
| | | 701/28 |
| 2017/0010613 A1 | 1/2017 | Fukumoto |
| 2017/0192437 A1 | 7/2017 | Bier et al. |
| 2017/0297569 A1* | 10/2017 | Nilsson ................ B60W 10/18 |
| 2017/0307391 A1 | 10/2017 | Mason et al. |
| 2018/0004211 A1 | 1/2018 | Grimm et al. |
| 2019/0011275 A1 | 1/2019 | Whinston et al. |
| 2019/0108753 A1* | 4/2019 | Kaiser ..................... H04W 4/02 |
| 2019/0186936 A1 | 6/2019 | Ebner et al. |
| 2019/0217857 A1* | 7/2019 | Sorin ................ B60W 60/0016 |
| 2020/0173798 A1* | 6/2020 | Koseki ..................... G08G 1/04 |
| 2020/0286309 A1 | 9/2020 | Chellapilla et al. |
| 2020/0301419 A1* | 9/2020 | Joseph ................ G05D 1/0223 |

\* cited by examiner

MODEL-BASED ROUTING FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to navigate an autonomous vehicle, a routing system may determine a route from a vehicle's current location to a destination location. A planning system may then use the route to plan a short-term trajectory in order to cause the vehicle to progress along the route. Typical routing approaches may attempt to route a vehicle according to a shortest distance metric or a shortest time traveled, while routing approaches may avoid specific locations, such as highways or toll roads. However, for autonomous vehicles there may be additional considerations to consider, such as how likely the vehicle is to become stranded, how likely the vehicle is to become disengaged (i.e. require a switch from an autonomous driving mode to a manual driving mode), whether the vehicle will need to make lane changes, whether the vehicle will be making unprotected turns at traffic light-controlled intersections, etc.

BRIEF SUMMARY

Aspects of the disclosure provide a method of selecting a route for a vehicle having an autonomous driving mode. The method includes identifying, by one or more processors, an initial location; using, by the one or more processors, the initial location to determine a set of possible routes to a destination location; determining, by the one or more processors, a cost for each route of the set of possible routes by: inputting time of day information, map information, and details of the route into one or more models in order to determine whether the vehicle is likely to become stranded along the route, and assessing the cost based at least in part on the determination of whether the vehicle is likely to become stranded along the route. The method also includes selecting, by the one or more processors, one of the routes of the set of possible routes based on any determined costs; and controlling, by the one or more processors, the vehicle in the autonomous driving mode using the selected one.

In one example, the time of day information indicates corresponds to whether the vehicle is currently in a high traffic time or a low traffic time. In another example, stranding corresponds to the vehicle waiting at least a predetermined amount of time without progressing along the route. In another example, the one or more models provide a binary indication of whether or not the vehicle is likely to become stranded along the route, and the assessment is further based on the binary indication. In another example, inputting the time of day information, the map information, and the details of the route into the one or more models provides an indication whether the vehicle is likely to disengage from the autonomous driving mode, such that a driver must take control of the vehicle, along the route. In this example, the one or more models provide a binary indication of whether or not the vehicle is likely to disengage along the route, and the assessment is further based on the binary indication. In another example, the details of the route includes an estimated duration for a lane change and determining the cost of the route further includes inputting the estimated duration into the one or more models in order to determine whether the vehicle is likely to successfully complete the lane change, and wherein assessing the cost is further based on the determination of whether the vehicle is likely to successfully complete the lane change. In another example, the one or more models provide a binary indication of whether or not the vehicle is likely to successfully complete the lane change, and the assessment is further based on the binary indication. In another example, the details of the route include a turn at an intersection and determining the cost of the route further includes inputting the location of the turn into the one or more models in order to determine whether the turn is likely to be unprotected, and assessing the cost is further based on the determination of whether the turn is likely to be unprotected. In this example, the one or more models provide a binary indication of whether the turn will be protected or unprotected, and the assessment is further based on the binary indication.

Another aspect of the disclosure provides a system for selecting a route for a vehicle having an autonomous driving mode. The system includes one or more processors configured to: identify a current location of a vehicle; use the current location of a vehicle to determine a set of possible routes to a destination location; determine a cost for each route of the set of possible routes by: inputting time of day information, map information, and details of that route into one or more models in order to determine whether the vehicle is likely to be stranded along that route, and assessing the cost based at least in part on the determination of whether the vehicle is likely to be stranded along that route. The one or more processors are also configured to select one of the routes of the set of possible routes based on any determined costs and control the vehicle in the autonomous driving mode using the selected one.

In one example, stranding corresponds to the vehicle waiting at least a predetermined amount of time without progressing along the route. In another example, the one or more models provide a binary indication of whether or not the vehicle is likely to become stranded along the route, and the one or more processors are further configured to assess the cost further based on the binary indication. In another example, inputting the time of day information, the map information, and the details of the route into the one or more models provides an indication whether the vehicle is likely to disengage from the autonomous driving mode, such that a driver must take control of the vehicle, along the route. In this example, the one or more models provide a binary indication of whether or not the vehicle is likely to disengage along the route, and the one or more processors are further configured to assess the cost further based on the binary indication. In this example, the details of the route includes an estimated duration for a lane change and the one or more processors are further configured to determine the cost of the route further includes inputting the estimated duration into the one or more models in order to determine whether the vehicle is likely to successfully complete the lane change, and the one or more processors are further configured to assess the cost further based on the determination of whether the vehicle is likely to successfully complete the lane change. In another example, the one or more models provide a binary indication of whether or not the vehicle is likely to successfully complete the lane change, and the one or more processors are further configured to assess the cost further based on the binary indication. In this example, the details of the route include a turn at an intersection and the one or more processors are further configured to determine the cost of the route by inputting the location of the turn into the one or more models in order to determine whether the turn is likely to be unprotected, and the one or more processors are further configured to assess the cost is further based on the determination of whether the turn is likely to be unprotected. In addition, the one or more models provide a binary indication of whether the turn will be protected or unprotected, and the one or more processors are further considered to assess the cost based on the binary indication. In another example, the system also includes the vehicle.

DETAILED DESCRIPTION

Overview

Figure 1:
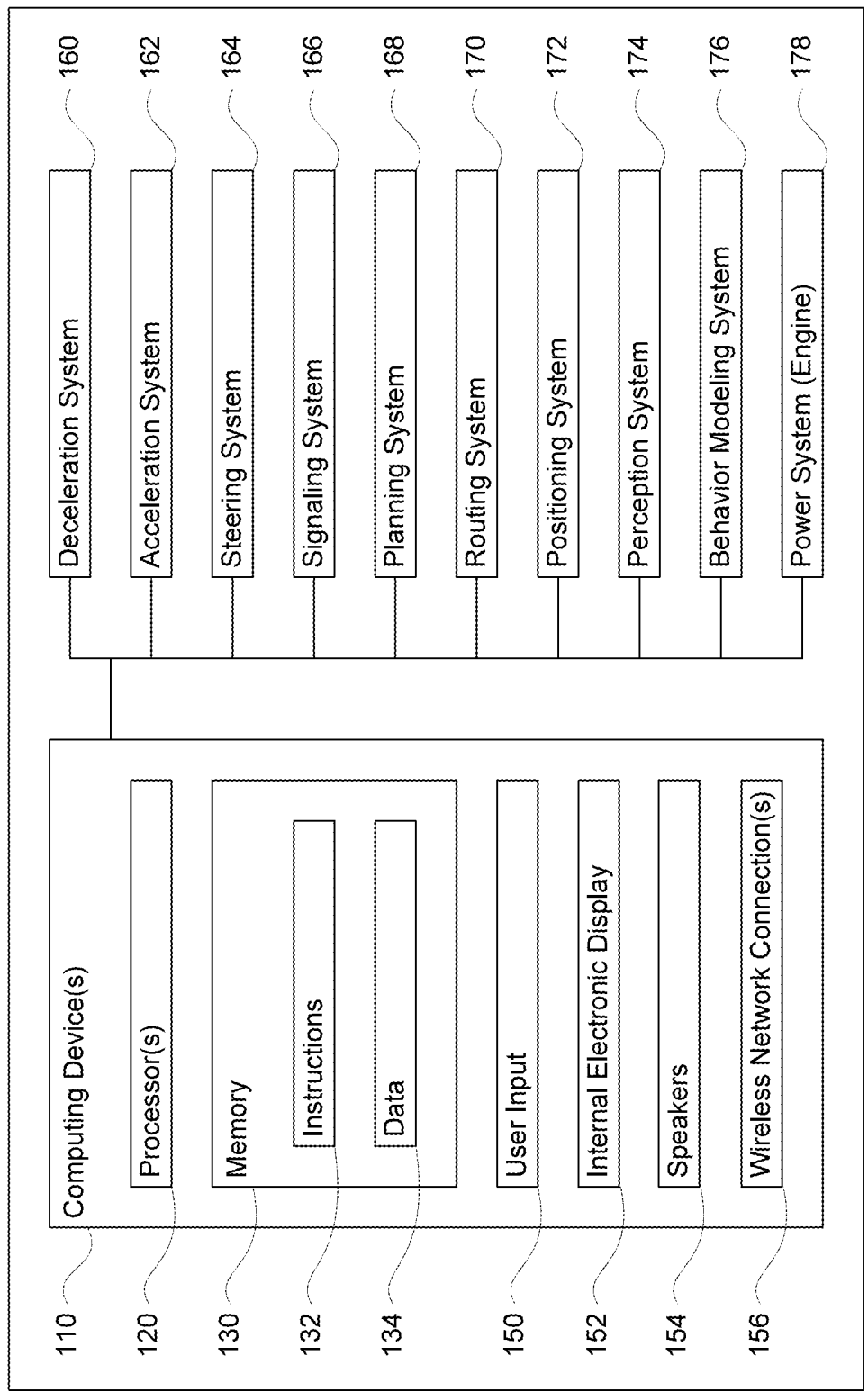
FIG. 1 is a functional diagram of an example vehicle in accordance with an exemplary embodiment.

The technology relates to routing for autonomous vehicles. For example, a routing system may determine a route from a vehicle's current location to a destination location. A planning system may then use the route to plan a short-term trajectory in order to cause the vehicle to progress along the route. Typical routing approaches may attempt to route a vehicle according to a shortest distance metric or a shortest time traveled, while routing approaches may avoid specific locations, such as highways or toll roads. However, for autonomous vehicles there may be additional considerations to consider, such as how likely the vehicle is to become stranded, how likely the vehicle is to become disengaged (i.e. require a switch from an autonomous driving mode to a manual driving mode), whether the vehicle will need to make lane changes, whether the vehicle will be making unprotected turns at traffic light-controlled intersections, etc. At least some of these additional considerations may be modeled and used to select a route.

Each model may be trained using at least some log data. This log data may be collected from data generated by a vehicle's various systems. For instance, the log data may be a record of all events that occur while a vehicle is driving in an autonomous driving mode. This may include information such as locations, routes, trajectories, speeds, accelerations, decelerations, turning behaviors, detected objects, as well as various messages or annotations generated by the vehicle's various systems.

In the example of a strandings model, the training data may include messages or annotations identifying information about actual or likely strandings. A stranding may correspond to the vehicle waiting at least a predetermined amount of time without progressing along the route. For instance, each time a vehicle is waiting for some period of time along a route, the log data may include an annotation identifying why the vehicle has stopped. The strandings model may then be trained. For instance, the training may include using time of day information, map information, and the location of the vehicle as training inputs as well as the identified likely strandings and strandings as training outputs. The strandings model may be trained to identify whether a vehicle is likely to be stranded at a given location and/or when the vehicle is attempting a particular maneuver.

In the example of a disengage model, the training data may include messages or annotations identifying actual disengages. This may not be relevant to vehicles which only have an autonomous driving mode. The disengages model may then be trained. For instance, the training may include using time of day information, map information, and the location of the vehicle as training inputs as well as the identified disengages as training outputs. The disengages model may be trained to identify whether a vehicle is likely to disengage at a given location and/or when the vehicle is attempting a particular maneuver.

In the example of a lane change model, the training data may include the log data identifying lane changes. For instance, for each route, the routing system may generate annotations identify locations where the vehicle is expected to make a lane change. The annotations may also identify an expected duration for the lane change, or rather, how long the vehicle is expected to have to complete the lane change. The output of the planning system, i.e. the vehicle's trajectories, may then be analyzed to determine whether for each annotation a successful lane change was made or whether the lane change was aborted for some reason. The lane change model may then be trained. For instance, the training may include using time of day information, map information, the location of the vehicle, the duration of the lane change as training inputs as well as whether or not the lane change was successful or aborted as training outputs. Lane change model may be trained to identify whether a vehicle is likely to successfully complete a lane change.

In the example of an unprotected turns model, the training data may include the log data identifying turns at intersections. For instance, for each route, the routing system may generate annotations identify locations where the vehicle is expected to make a left turn. The output of the perceptions system, for instance, sensor data generated by the vehicle's various sensors may be analyzed to determine whether a green turning arrow was lit when the vehicle made the left or right turn. In some instances, these green arrows may be time based and follow certain patterns. In this regard, the unprotected turns model may be a time-based model which predicts the likelihood of the vehicle having to make an unprotected turn. For instance, the training may include using timestamps for when the log data indicates that a vehicle made a turn, map information, the location of the vehicle as well as the state of any green arrow at the time the turn was made as training outputs. The unprotected turn model may be trained to identify whether a vehicle is likely to make an unprotected turn.

One or more of the aforementioned models may then be transmitted or otherwise loaded into the memory of a vehicle and used for routing. The various models described above may also be used for other purposes. The features described herein may be useful in selecting routes for an autonomous vehicle. The routes may be chosen in order to avoid certain situations, including strandings and disengages (where applicable), as well as certain maneuvers, including lane changes that are not likely to be successful, as well as unprotected turns. Moreover, because these maneuvers are generally avoided at the routing level, they need not even be considered at the planning system (i.e. the trajectory generation) level.

EXAMPLE SYSTEMS

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). For instance, electronic display 152 may be located within a cabin of vehicle 100 and may be used by computing devices 110 to provide information to passengers within the vehicle 100. In Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planning system 168 may be used by computing device 110 in order to follow the route. In this regard, the planning system 168 and/or routing system 166 may store detailed map information, e.g., highly detailed maps identifying the shape and elevation of roadways, lane lines, intersections, crosswalks, speed limits, traffic signals, buildings, signs, real time traffic information, pullover spots, vegetation, or other such objects and information.

Figure 2:
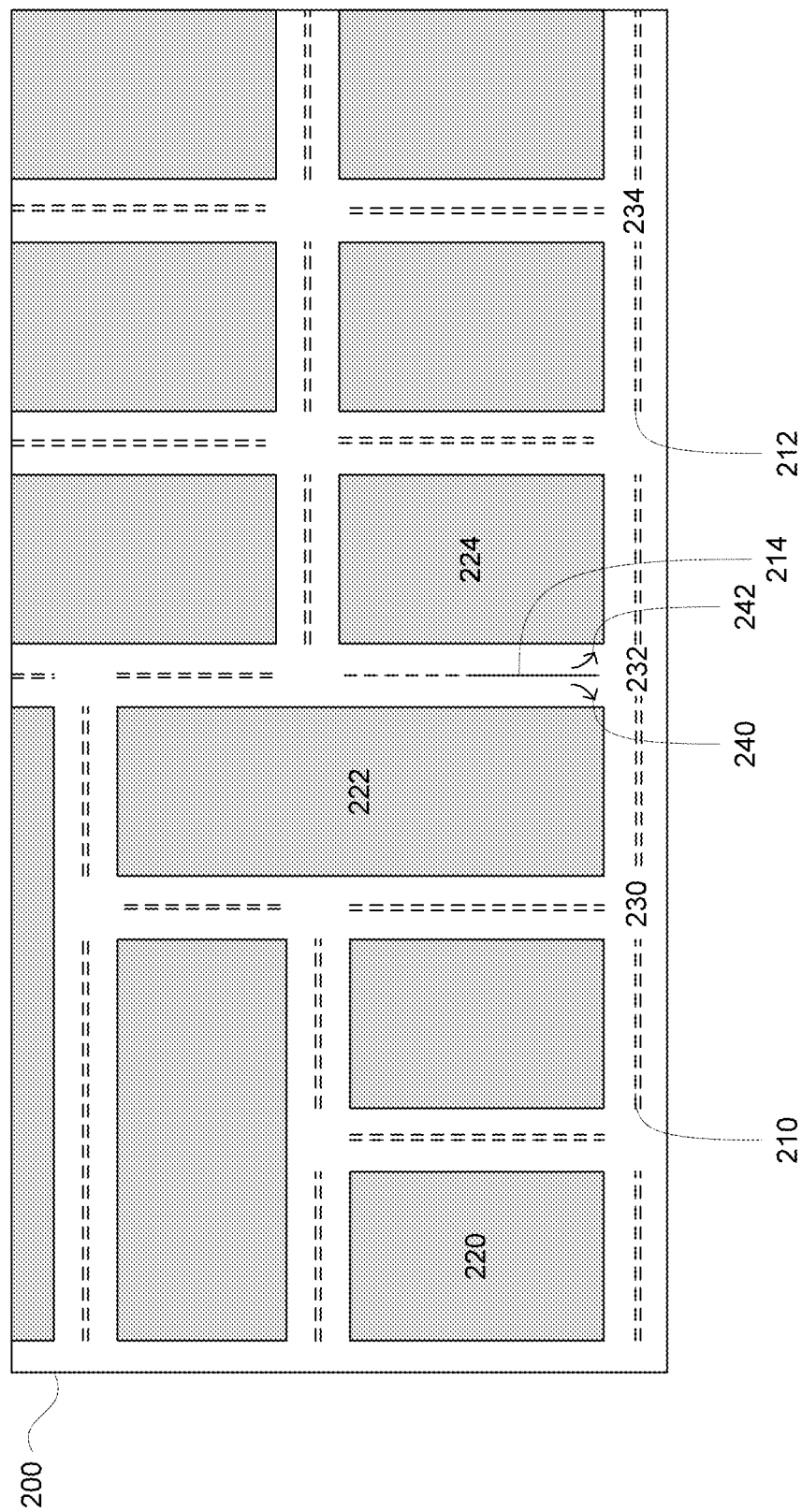
FIG. 2 is an example of map information in accordance with aspects of the disclosure.

FIG. 2 is an example of map information 200 for a section of roadway corresponding to a service area for autonomous vehicles such as vehicle 100. In this example, the map information 200 includes information identifying the shape, location, and other characteristics of lane lines represented by dashed-lines 210, 212 and solid line 214 designating roads or otherwise drivable areas, non-drivable areas (such as buildings, parks, etc.) represented by shaded areas 220, 222, 224, as well as intersections 230, 232, 234. In addition, the map information 200 also includes other features such as road markings corresponding to right turn only arrow 240 and left turn only arrow 242. Although only few features are depicted in the map information 200 of FIG. 2, however, the map information 200 may include significantly more features and details in order to enable the vehicle 100 to be controlled in the autonomous driving mode, including for instance the locations and characteristics of traffic control devices, such as stop signs and traffic lights, etc.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by autonomous control system 176 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
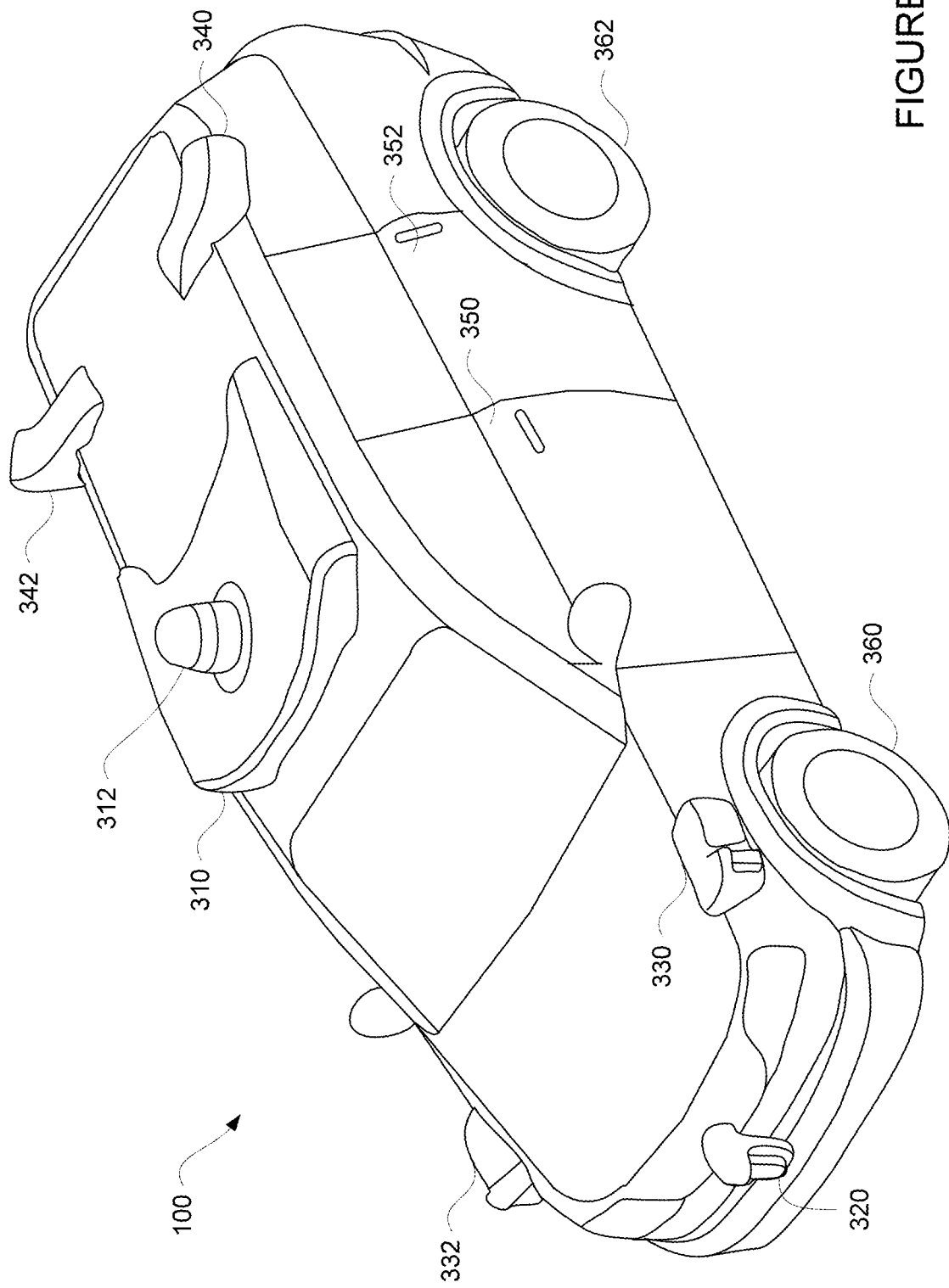
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a route generated by a routing module of the routing system 166. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planning system 168.

The autonomous control system 176 may use the positioning system 170 to determine the vehicle's location and perception system 172 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
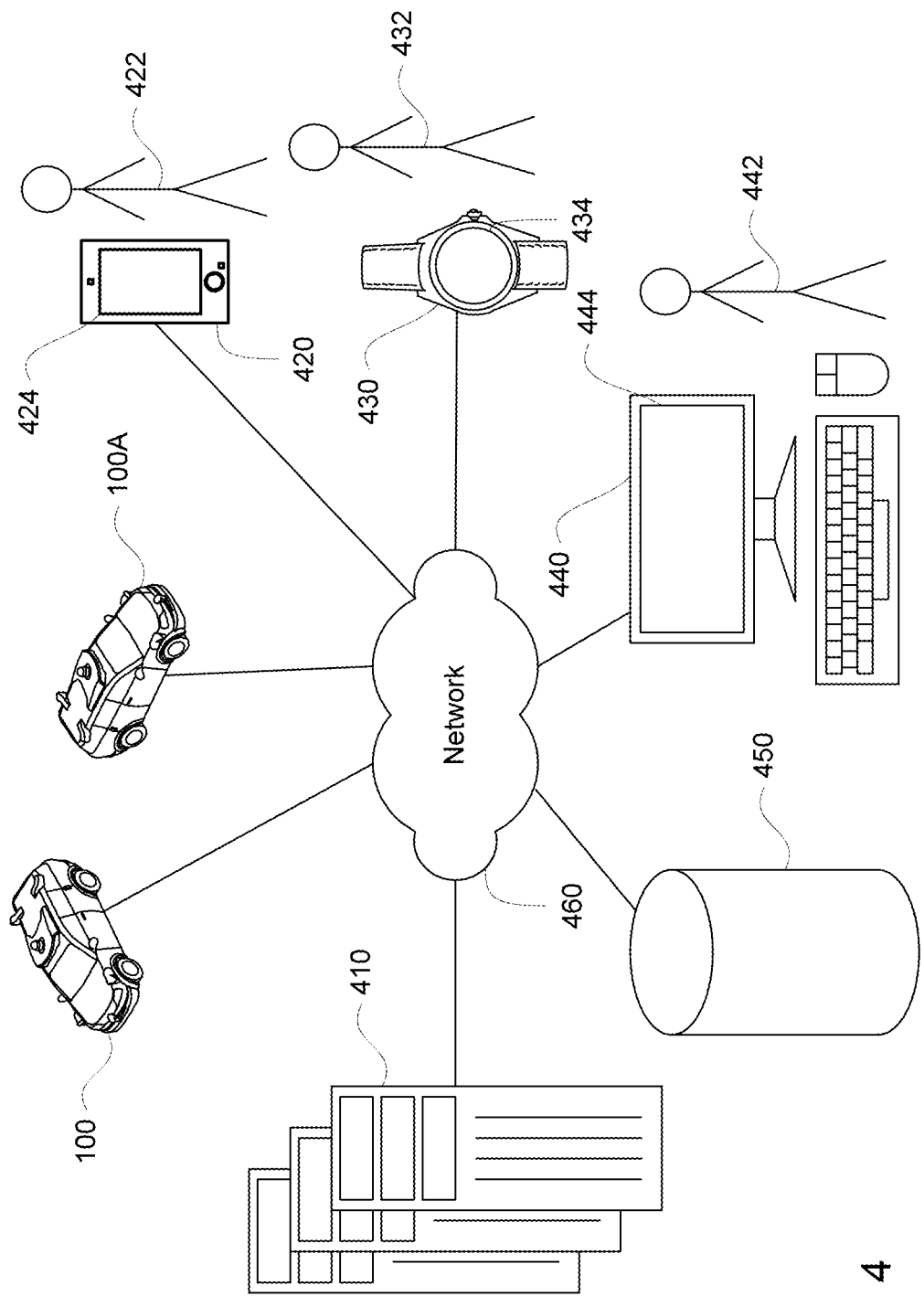
FIG. 4 is a pictorial diagram of an example system in accordance with aspects of the disclosure.
Figure 5:
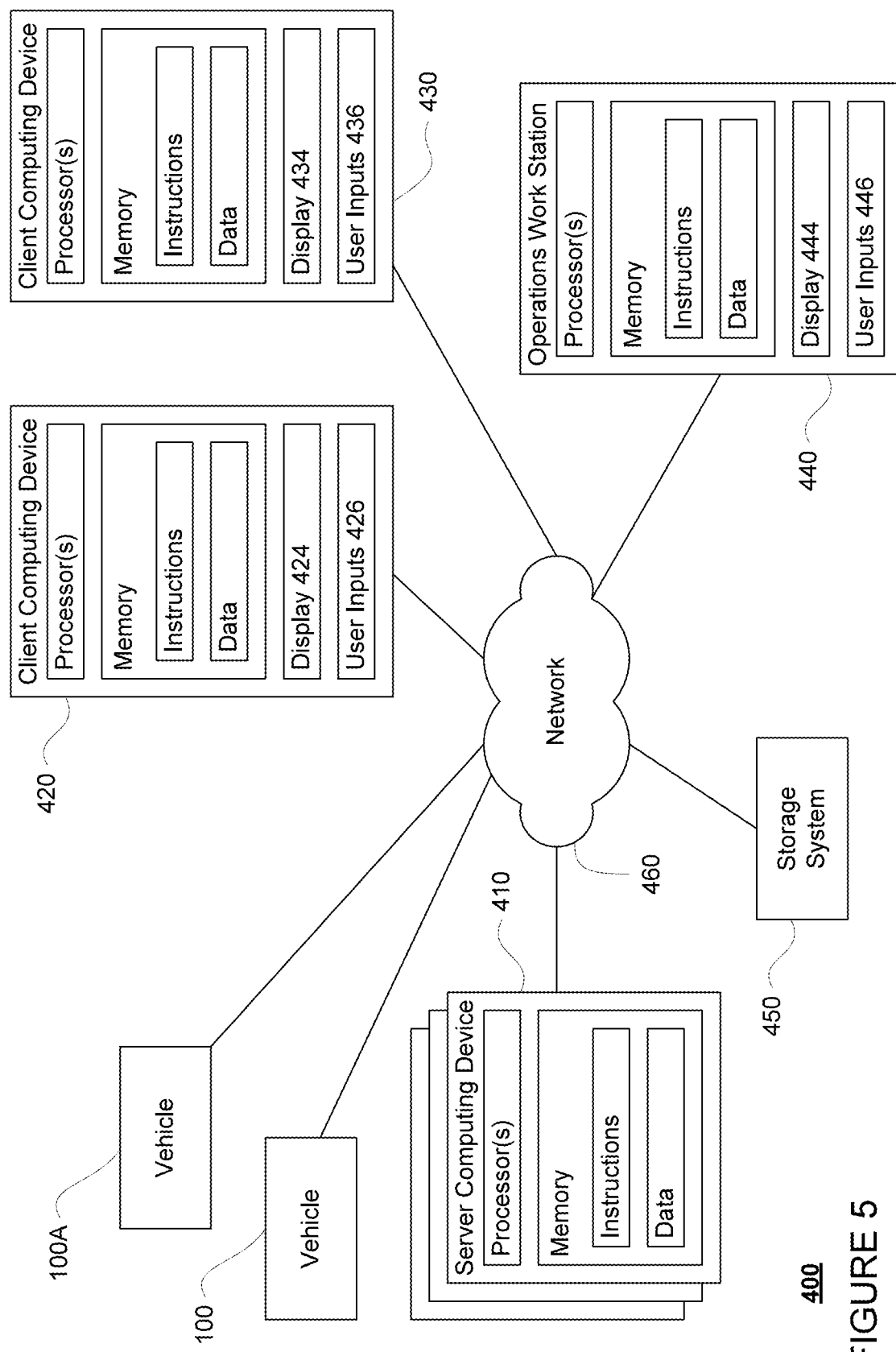
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information. For instance, the storage system 450 may also store the aforementioned autonomous vehicle control software which is to be used by vehicles, such as vehicle 100, to operate a vehicle in an autonomous driving mode. This autonomous vehicle control software stored in the storage system 450 include various invalidated and validated versions of the autonomous vehicle control software. Once validated, the autonomous vehicle control software may be sent, for instance, to memory 130 of vehicle 100 in order to be used by computing devices of the vehicle in order to control the vehicle in an autonomous driving mode.

Storage system 450 may store various types of information as described in more detail below. This information may be retrieved or otherwise accessed by a server computing device, such as one or more server computing devices 410, in order to perform some or all of the features described herein. For instance, the storage system 450 may store one or more models as well as model parameters discussed further below. The storage system 450 may also store log data. This log data may be collected from data generated by a vehicle's various systems. For instance, the log data may be a record of all events that occur while a vehicle is driving in an autonomous driving mode. For example, the log data may include sensor data generated by a perception system, such as the perception system 172 of vehicle 100. As an example, the sensor data may include raw sensor data as well as data identifying defining characteristics of perceived objects (including other road users) such as shape, location, orientation, speed, etc. of objects such as vehicles, pedestrians, bicyclists, vegetation, curbs, lane lines, sidewalks, crosswalks, buildings, etc. In addition, the log data may include information such as locations, routes, trajectories, speeds, accelerations, decelerations, turning behaviors, as well as various messages or annotations generated by the vehicle's various systems as described herein.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

The technology relates to routing for autonomous vehicles where there may be additional considerations to consider, such as how likely the vehicle is to become stranded, how likely the vehicle is to become disengaged (i.e. require a switch from an autonomous driving mode to a manual driving mode), whether the vehicle will be making unprotected turns at traffic light-controlled intersections, etc. At least some of these additional considerations may be modeled and used to select a route.

Each model may be trained using at least some log data. For instance, the server computing devices 410 may access the log data of storage system 450 in order to train one or more models as discussed further below. In the example of a strandings model, the training data may include messages or annotations identifying information about actual or likely strandings. A stranding may correspond to the vehicle waiting at least a predetermined amount of time without progressing along the route. For instance, each time a vehicle is waiting for some period of time along a route, the log data may include an annotation identifying why the vehicle has stopped. For example, some waiting may be due to yielding to traffic or an occlusion, waiting for a passenger (as in a pick up or drop off), stopping for a traffic light, etc. If however, the vehicle was required to wait for more than a first predetermined period of time, such as 30 seconds or more or less, for any of these reasons and there was a disengage (e.g. a driver took control of the vehicle in a semi-autonomous or manual driving mode), such events may be identified as a likely stranding for training purposes. If the vehicle was required to wait for a second predetermined period of time, such as 60 seconds or more or less, whether or not a driver took control, such events may be identified as a stranding.

The strandings model may then be trained, for instance, using the server computing devices 410. For instance, the training may include using time of day information, map information, and the location of the vehicle as training inputs as well as the identified likely strandings, strandings, and in some cases the duration of the strandings, as training outputs. The time of day information may indicate a specific time of day (i.e. 5 pm or 1 pm) or may be more generalized, such as high traffic (e.g. rush hour) times or low traffic times (e.g. not rush hour). In this regard, rather than using traffic data to train (or use) the model, traffic information such as expected traffic lane speed or the number of other vehicles detected using the vehicle's perception system may be used to categorize events to high traffic times or low traffic times. This may increase the accuracy of predictions made using the models as some strandings may simply be due to high traffic conditions. In addition, the map information may include details such as the configuration of intersections, such as whether there are lanes of traffic that have precedence over other lanes of traffic, how many lanes there are, where the lanes are located, etc.

For instance, the training input may include a list of values corresponding to specific features representative of the circumstances when the vehicle is at a given location and/or attempting a particular maneuver. The values for these features may be determined from the log data and/or the map information. An example of the specific features and corresponding values is included in the table below:

| Feature | Input Value Options |
|---|---|
| What is the vehicle's current location? | Latitude and longitude OR other location identifier |
| If the vehicle is making a turn, what is the direction of the turn? | Left, right, u-turn |
| Is the vehicle making an unprotected turn? | True, false |
| How many lanes of traffic is the vehicle unprotected from? | 0, 1, 2, 3, . . . |
| What is the maximum speed limit of the lanes that the vehicle is unprotected from? | 25, 30, 35, 40, 45, . . . |
| Are there any known static objects (such as buildings or trees) that restrict perception (or visibility)? | True, false |
| How heavy is the traffic? | None, low, medium, high |
| What is the current time of day? | 0, 1, 2, . . . , 23 (Each representative of an hour during the day) |

The strandings model may be trained to identify whether a vehicle is likely to be stranded at a given location and/or when the vehicle is attempting a particular maneuver. In this regard, the training output label may include whether the vehicle became stranded, and as noted above, can be determined from an analysis of log data. The strandings model may identify a binary "yes" (or 1) for a stranding or "no" (or 0) for no stranding as output. Thus, the output of the strandings model may indicate a confidence that the vehicle will get stranded when attempting a particular maneuver (such as a turn). For instance, when a set of features is input into the strandings model, the output may be a 1 or a 0 or, in some cases, some value therebetween. Where the output is a binary value (e.g. 0 or 1), the strandings model itself may be a logistic regression or a decision tree or any other model which can provide a binary output.

Alternatively, the strandings model may be trained to identify an expected number of seconds that a vehicle will likely spend at a given location. In this example, the training outputs may also include an amount of time that the vehicle spent waiting from the log data. However, to keep the strandings model to a manageable size as the memory on a vehicle is limited and to keep the data processing resource requirements small when the model is being used in real time on a vehicle, the strandings model need not be trained using additional information such as current traffic conditions and/or other log data from the vehicle.

In the example of a disengage model, the training data may include messages or annotations identifying actual disengages. This may not be relevant to vehicles which only have an autonomous driving mode. For instance, each time there is a disengage (e.g. a driver took control of the vehicle in a semi-autonomous or manual driving mode), such events may be identified from the log data as disengages. In some instances, disengages that were initiated by a driver for reasons other than safety or to enable the vehicle to make progress, such as where the driver wanted to take a break, etc., may be ignored.

In other instances, some stranding situations may also be considered "disengages". For example, situations in which the vehicle was stuck or required to wait for more than 1 minute, this may be considered a disengage. This may enable the server computing devices 410 to automatically identify situations in which a vehicle was stuck not proceeding through an intersection and may or may not have been able to proceed autonomously through the intersection.

Alternatively, the server computing devices 410 may also identify situations in which a vehicle was stranded and then thereafter there was a disengage. For instance, if a vehicle was required to wait for more than 1 minute and immediately thereafter there was a disengage, this may be considered a stranding and not a disengage, for instance, because the disengage was actually due to the vehicle becoming stranded. In such situations, the server computing devices 410 may ignore or otherwise filter out those situations when training the disengage model as such situations may be better utilized for training the strandings model.

The disengages model may then be trained, for instance, using the server computing devices 410. For instance, the training may include using time of day information (see discussion above), map information, and the location of the vehicle for each disengage as training inputs as well as the identified disengages as training outputs.

For instance, the training input may include a list of values corresponding to specific features representative of the circumstances when the vehicle is at a given location and/or attempting a particular maneuver. The values for these features may be determined from the log data and/or the map information. An example of the specific features and corresponding values is included in the table below:

| Feature | Input Value Options |
| --- | --- |
| What is the vehicle's current location? | Latitude and longitude OR other location identifier |
| What is the speed limit for the road on which the vehicle is currently traveling? | 10, 15, 20, 25, 30, 35, . . . |
| How many lanes on the road are going in the same direction of traffic as the vehicle? | 1, 2, 3, . . . |
| Is there a median on the road? | True, false |
| Is there a bike lane on the road? | True, false |
| Is there a parking lot adjacent to the road? | True, false |
| Is there a shared turning lane on the road? | True, false |
| Is the vehicle within a predetermined distance (such as 50 meters or more or less) from an intersection? | True, false |
| What is the current time of day? | 0, 1, 2, . . . , 23 (Each representative of an hour during the day) |

The disengages model may be trained to identify whether a vehicle is likely to disengage at a given location and/or when the vehicle is attempting a particular maneuver. In this regard, the disengage model may identify a binary yes (disengage) or no (no disengage) output. In this regard, the training output label may include whether the vehicle disengaged, and as noted above, can be determined from an analysis of log data. The disengage model may identify a binary a binary "yes" (or 1) for a disengage or "no" (or 0) for no disengage as output. Thus, the output of the disengage model may indicate a confidence that the vehicle will disengage when attempting a particular maneuver (such as a turn). For instance, when a set of features is input into the disengage model, the output may be a 0 or a 1 or, in some cases, some value therebetween. Where the output is a binary value (e.g. 0 or 1), the disengage model itself may be a logistic regression or a decision tree or any other model which can provide a binary output.

Again, as with the strandings model, to keep the disengages model to a manageable size as the memory on a vehicle is limited and to keep the data processing resource requirements small when the model is being used in real time on a vehicle, the disengages model need not be trained using additional information such as current traffic conditions and/or other log data from the vehicle. Alternatively, rather than being a separate and distinct model, these disengage prediction features may be incorporated into a model that also predicts strandings.

In some instances, additional annotations may be available and thus used to determine what strandings or disengages should be used as training data. For instance, drivers and/or passengers of a vehicle may have the ability to provide annotations, written, visual and/or audible, each time there is a disengage. For example, a driver may indicate that he or she took over because she was uncomfortable with a traffic situation, and thus, the disengage may not be suitable for training purposes. In this regard, some disengages from the log data may be filtered from the training data prior to training the models. As another instance, if a particular stranding or disengage was uncomfortable for a driver or passenger, the driver or passenger may provide feedback indicating as such. This feedback may be stored as annotations which indicate how uncomfortable some maneuver was for the user. These can be used to train a model which estimates how uncomfortable a particular stranding or disengage was for a passenger. Those strandings or disengages which are likely to be most uncomfortable may be used as training data.

In the example of a lane change model, the training data may include the log data identifying lane changes. For instance, for each route, the routing system 166 may generate annotations identify locations where the vehicle is expected to make a lane change. The annotations may also identify an expected duration for the lane change, or rather, how long the vehicle is expected to have to complete the lane change. The output of the planning system 168, i.e. the vehicle's trajectories, may then be analyzed to determine whether for each annotation a successful lane change was made or whether the lane change was aborted for some reason. This analysis may provide information such as the speed of the vehicle during the lane change, the acceleration and/or deceleration of the vehicle during the lane change, as well as the time of day information.

The lane change model may then be trained, for instance, using the server computing devices 410. For instance, the training may include using time of day information (see examples above), map information (including lane curvature and distance to a traffic control such as a traffic signal light or a stop sign), the location of the vehicle, the duration of the lane change, as well as a direction of the lane change as training inputs as well as whether or not the lane change was successful or aborted as training outputs.

For instance, the training input may include a list of values corresponding to specific features representative of the circumstances when the vehicle is attempting a lane change maneuver. The values for these features may be determined from the log data. An example of the specific features and corresponding values is included in the table below:

| Feature | Input Value Options |
| --- | --- |
| What is the vehicle's current location? | Latitude and longitude OR other location identifier |
| What is the direction of the lane change? | Left, right |
| What is the length of a corridor of opportunity (along which the vehicle could potentially change lanes and after which the vehicle would have to re-route) for the lane change? | A Real Number Distance OR one of a plurality of predetermined bucketized distances |
| How many intersections between the vehicle's current location and a corridor of opportunity to make the lane change? | 0, 1, 2, 3, ... |
| How heavy is the traffic? | None, low, medium, high |
| What is the current time of day? | 0, 1, 2, ... , 23 (Each representative of an hour during the day) |

The lane change model may be trained to identify whether a vehicle is likely to to be successful when attempting a lane change at a given location. In this regard, the lane change model may identify a binary yes (disengage) or no (no disengage) output. In this regard, the training output label may include whether the vehicle successfully completed a lane change, and as noted above, can be determined from an analysis of log data. The lane change model may identify a binary "yes" (or 1) for a successful lane change or "no" (or 0) for an unsuccessful lane change as output. Thus, the output of the lane change model may indicate a confidence that the vehicle will successfully complete a lane change at a given location. For instance, when a set of features is input into the lane change model, the output may be a 1 or a 0 or, in some cases, some value therebetween representative of the likelihood of success of a lane change maneuver at a given location. Where the output is a binary value (e.g. 0 or 1), the lane change model itself may be a logistic regression or a decision tree or any other model which can provide a binary output. However, to keep the lane change model to a manageable size as the memory on a vehicle is limited and to keep the data processing resource requirements small when the model is being used in real time on a vehicle, the lane change model need not be trained using additional information such as current traffic conditions and/or other log data from the vehicle. Alternatively, rather than being a separate and distinct model, these lane change prediction features may be incorporated into a model that also predicts strandings and/or disengages.

In the example of an unprotected turns model, the training data may include the log data identifying turns at intersections. For instance, for each route, the routing system may generate annotations that identify locations where the vehicle is expected to make a particular type of turn, such as a left turn. The output of the perception system, for instance, the sensor data generated by the vehicle's various sensors may be analyzed to determine whether a green turning arrow was lit when the vehicle made the left or right turn. Alternatively, this information may simply be annotated in the log data for each turn.

In some instances, green arrows may be time based and follow certain patterns. For example, some left turns may always be unprotected, some left turns signals may start out with a green arrow (protected), turn to a green circle (unprotected), and thereafter change to a red circle, while other left turns signals may start out with green arrow (protected), change to a yellow arrow (protected), and thereafter change to a red arrow or red circle. In addition, at some traffic intersections, a green arrow light may only be used during high traffic times, times when high pedestrian traffic is expected, on holidays, etc. In this regard, the unprotected turns model may be a time-based model which predicts the likelihood of the vehicle having to make an unprotected turn.

The unprotected turns model may then be trained, for instance, using the server computing devices 410. For instance, the training may include using timestamps (rather than time of day information) for when the log data indicates that a vehicle made a turn, map information (which may identify the characteristics of the intersection at which the turn was made), the location of the vehicle as well as the state of any green arrow at the time the turn was made as training outputs. The unprotected turn model may be trained to identify whether a vehicle is likely to make an unprotected turn.

For instance, the training input may include a list of values corresponding to specific features representative of the circumstances when the vehicle is attempting an unprotected turn. The values for these features may be determined from the log data. An example of the specific features and corresponding values is included in the table below:

| Feature | Input Value Options |
| --- | --- |
| What is the vehicle's current location? | Latitude and longitude OR other location identifier |
| What is the identifier for the traffic light that controls an intersection for the unprotected turn? | Identifier (e.g. a number) |
| What is the speed limit for the road on which the vehicle is currently traveling? | 10, 15, 20, 25, 30, 35, ... |
| What is the speed limit for the road on which the vehicle is going to be turning for the unprotected turn? | 10, 15, 20, 25, 30, 35, ... |
| How many lanes on the road are going in the same direction of traffic as the vehicle? | 1, 2, 3, ... |
| How many lanes on the road on which the vehicle is going to be turning for the unprotected turn? | 1, 2, 3, ... |
| What is the current time of day? | 0, 1, 2, ... , 23 (Each representative of an hour during the day) |

The unprotected turn model may be trained to identify whether a vehicle is likely to be successful when attempting an unprotected turn at a given location. In this regard, the training output label may include whether the vehicle successfully completed an unprotected turn, and as noted above, can be determined from an analysis of log data. The unprotected turn model may identify a binary "yes" (or 1) for a successful unprotected turn or "no" (or 0) for an unsuccessful unprotected turn. Thus, the output of the model may indicate a confidence that the vehicle will successfully complete an unprotected turn at a given location. For instance, when a set of features is input into the unprotected turn model, the output may be a 1 or a 0 or, in some cases, some value therebetween representative of the likelihood of success of an unprotected turn maneuver at a given location. Where the output is a binary value (e.g. 0 or 1), the unprotected turn model itself may be a logistic regression or a decision tree or any other model which can provide a binary output. Alternatively, rather than being a separate and distinct model, these unprotected turn prediction features may be incorporated into a model that also predicts strandings, disengages, and/or lane change success.

One or more of the aforementioned models may then be transmitted or otherwise loaded into the memory of a vehicle and used for routing. For instance, the one or more models may be stored in the memory 130 and/or in memory of the routing system 166. These one or more models may then be used to select a route for a vehicle, such as vehicle 100, having an autonomous driving mode.

Figure 7:
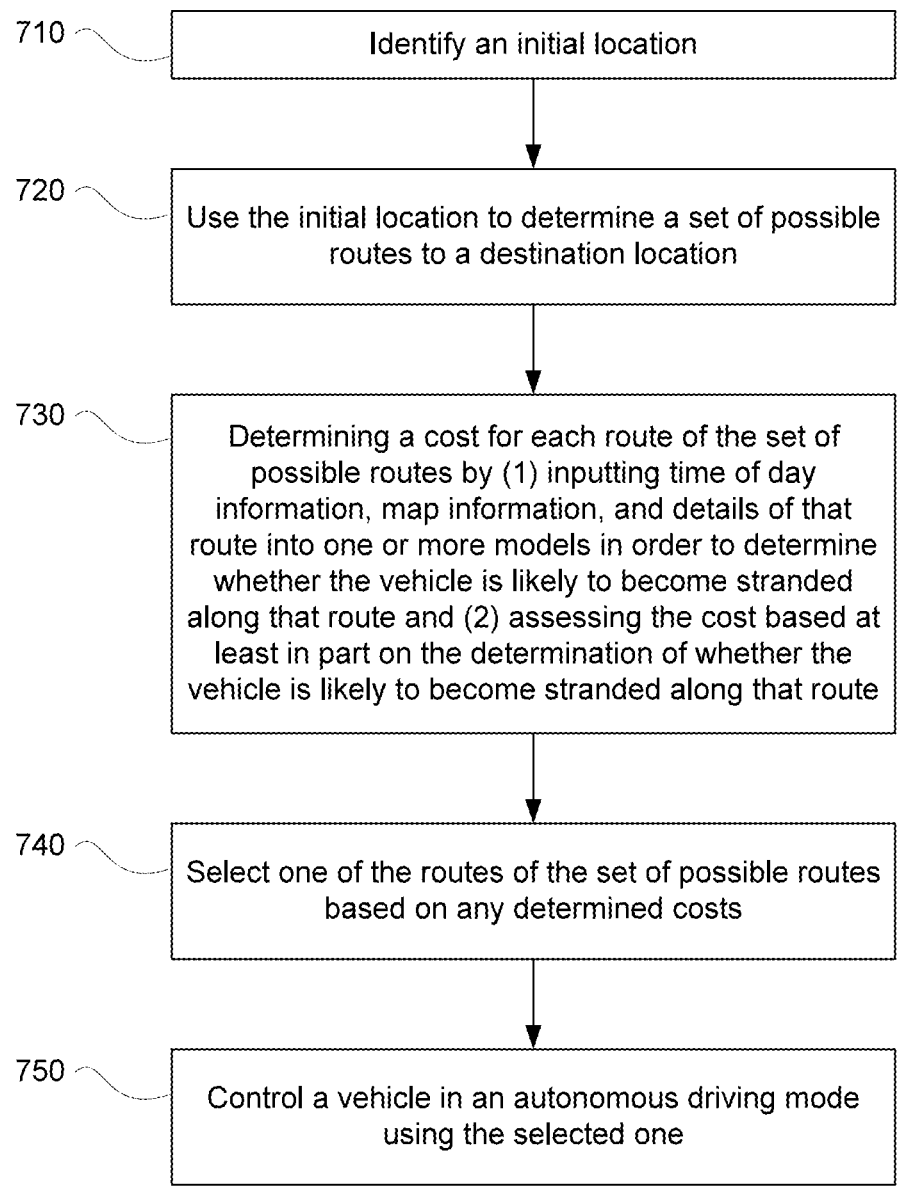
FIG. 7 is an example flow diagram in accordance with aspects of the disclosure.

FIG. 7 is an example flow diagram 700 of aspects of the disclosure relating to selecting a route for a vehicle which may be performed by one or more processors of a computing device, such as the processors 120 of computing device 110 and/or processors and a computing device of the routing system 166. In this example, at block 710, an initial location may be identified. This initial location may be a current location of the vehicle, a pickup location for a passenger, etc. In the case of a current location of the vehicle, this information may be provided, for instance, by the positioning system 170.

Figure 6:
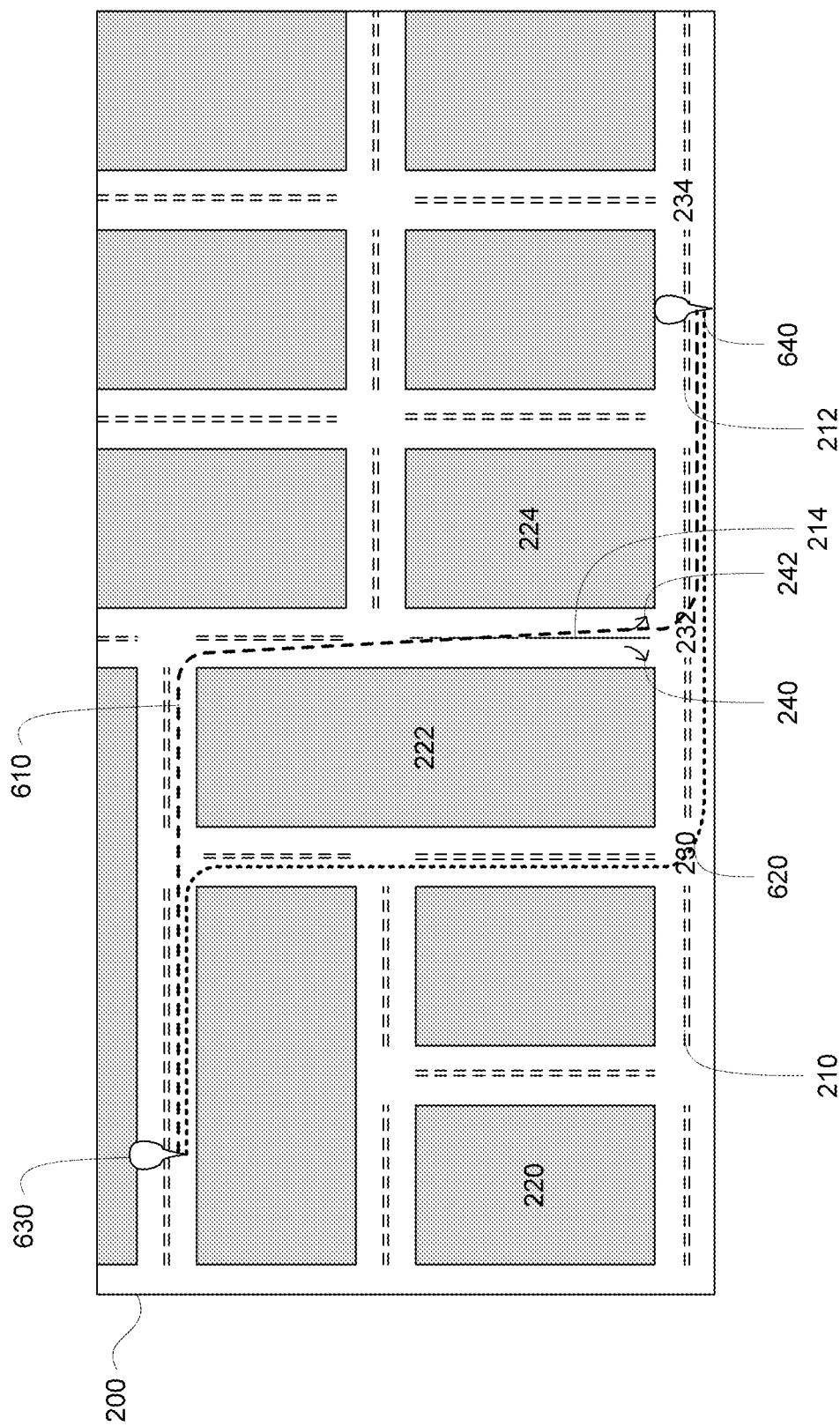
FIG. 6 is an example of map information with routes in accordance with aspects of the disclosure.

At block 720, the initial location is used to determine a set of possible routes. These routes may be determined using the map information, the current location of the vehicle, and a destination location. For instance, FIG. 6 is an example of the map information 200 including two possible routes, route 610 and route 620 between a current location of the vehicle 100 represented by marker 630 and a destination location of the vehicle represented by marker 640.

At block 730, a cost is determined for each route of the set of possible routes by inputting time of day information, map information, and details of that route into one or more models, such as the strandings model, in order to determine whether the vehicle is likely to be stranded along that route, and assessing the cost based at least in part on the determination of whether the vehicle is likely to be stranded along that route. In other words, the one or more models may be used to determine what these costs should be. For instance, a plurality of values representative of the current circumstances may be input into the one or more models as in the examples described above. In some instances, the one or more models, for instance the strandings model, may provide a binary indication (e.g. yes or no OR 1 or 0) of whether or not the vehicle is likely to become stranded along the route (for instance at a given location and/or when the vehicle is attempting a particular maneuver), and the assessment is further based on the binary indication. Alternatively, as described above, the one or more models may provide a likelihood of stranding, for instance on a scale of 0 (no stranding) to 1 (stranding) or on any other scale, and the assessment may also be based on the likelihood of stranding.

If a vehicle is likely to become stranded, such as where output of the model indicates yes or a value closer to 1, the cost for such routes may be very high. Similarly, if a vehicle not likely to be stranded, the cost for such routes may be very low. As such, if the strandings model indicates that route 610 is likely to cause the vehicle 100 to become stranded and the strandings model also indicates that route 620 is not likely to cause the vehicle 100 to become stranded, the cost of the route 610 based on the output of the strandings model may be higher than the cost of the route 620 based on the output of the strandings model.

In some instances, inputting the time of day information, the map information, and the details of the route into the one or more models, such as the disengage model, may also provide an indication whether the vehicle is likely to disengage from the autonomous driving mode, such that a driver must take control of the vehicle, along the route. In one example, as described above, disengage model may provide a binary indication (e.g. yes or no OR 1 or 0) whether the vehicle is likely to disengage, and the assessment may also be based on the binary indication. Alternatively, as described above, the disengage model may provide likelihood of disengaging, for instance on a scale of 0 (not no disengage) to 1 (disengage) or on any other scale, and the assessment may also be based on the likelihood of disengaging.

If a vehicle is likely to disengage, such as where output of the model indicates yes or a value closer to 1, the cost for such routes may be very high. Similarly, if a vehicle not likely to disengage, the cost for such routes may be very low. As such, if the disengage model indicates that route 610 is likely to cause the vehicle 100 to disengage and the disengage model also indicates that route 620 is not likely to cause the vehicle 100 to disengage, the cost of the route 610 based on the output of the disengage model may be higher than the cost of the route 620 based on the output of the disengage model.

In some instances, the details of the route may include an estimated duration for a lane change and determining the cost of the route also includes inputting the estimated duration into the one or more models, such as the lane change model, in order to determine whether the vehicle is likely to successfully complete the lane change. In such instances, assessing the cost may also be based on the determination of whether the vehicle is likely to successfully complete the lane change. In one example, as described above, the one or more models provide a binary indication (e.g. yes or no OR 1 or 0) of whether or not the vehicle is likely to successfully complete the lane change, and the assessment may also be based on the binary indication. Alternatively, as described above, the lane change model may provide a success probability, for instance on a scale of 0 (not successful) to 1 (successful) or on any other scale, and the assessment may also be based on the success probability.

If a vehicle is likely to miss a lane change, such as where output of the model indicates yes or a value closer to 1, the cost for such routes may be very high. Similarly, if a vehicle not likely to be miss a lane change, the cost for such routes may be very low. As such, if the lane change model indicates that route 610 is likely to cause the vehicle 100 to miss a lane change and the lane change model also indicates that route 620 is not likely to cause the vehicle 100 to miss a lane change, the cost of the route 610 based on the output of the lane change model may be higher than the cost of the route 620 based on the output of the lane change model.

In some instances, the details of the route may include a turn at an intersection and determining the cost of the route further includes inputting the location of the turn into the one or more models, such as the unprotected turns model, in order to determine whether the turn is likely to be unprotected. In such instances, assessing the cost may also be based on the determination of whether the turn is likely to be unprotected. In one example, the one or more models provide a binary indication (e.g. yes or no) of whether the turn will be protected or unprotected, and the assessment may also be based on the binary indication. Alternatively, the one or more models may provide a likelihood that the vehicle will need to make an unprotected turn, for instance on a scale of 0 (no unprotected turn) to 1 (unprotected turn) or on any other scale, and the assessment may also be based on the likelihood that the vehicle will need to make an unprotected turn.

If a vehicle is likely to have to make an unprotected turn, such as where output of the model indicates yes or a value closer to 1, the cost for such routes may be very high. Similarly, if a vehicle not likely to have to make an unprotected turn, the cost for such routes may be very low. As such, if the unprotected turn model indicates that route 610 is likely to cause the vehicle 100 to have to make an unprotected turn and the unprotected turn model also indicates that route 620 is not likely to cause the vehicle 100 to have to make an unprotected turn, the cost of the route 610 based on the output of the unprotected turn model may be higher than the cost of the route 620 based on the output of the unprotected turn model.

In this regard, the higher the probability of stranding, disengaging, unprotected turns, and unsuccessful lane changes, the higher the cost of a route. Similarly, the higher the probability of not stranding, not disengaging, no unprotected turns, and successful lane changes, the lower the cost of the route. Thus, the cost of a route may be determined by summing the costs determined using each of the one or more models with various other routing costs, such as costs related to an estimated travel time, avoiding certain areas (e.g. highways, school zones, high traffic areas, etc.) more typical of other navigation systems. Moreover, although the examples provided herein relate to individual models with different outputs, alternatively, a single model may be trained and used to provide all or some of the aforementioned outputs from each of the individual stranding model, disengage model, unprotected turn model, and lane change model.

At block 740, one of the routes of the set of possible routes is selected based on any determined costs. For instance, each time the vehicle's routing systems attempts to generate routes between locations, the routing system 166 may assess the cost of each route and select the route with the lowest overall cost. Although the examples provided herein relate to increasing costs when a vehicle is likely to become stranded, disengage, make an unprotected turn, or miss a lane change, the reverse may also be true such that the routing system 166 selects the route with the lowest overall cost. The selected route may then be published to the various other systems of the vehicle, including the planning system 168 and/or computing devices 110.

At block 750, a vehicle is controlled in an autonomous driving mode using the selected one (i.e. the selected route). In some instances, in order to control the vehicle in the autonomous driving mode, the planning system 168 may use the selected route and map information in order to generate a trajectory. This trajectory may be sent to the vehicle's computing device 110 which may cause the vehicle to follow the trajectory. As noted above, this may be achieved, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

The features described herein may be useful in selecting routes for an autonomous vehicle. The routes may be chosen in order to avoid certain situations, including strandings and disengages (where applicable), as well as certain maneuvers, including lane changes that are not likely to be successful, as well as unprotected turns. Moreover, because these maneuvers are generally avoided at the routing level, they may not necessarily need to be considered at the planning system (i.e. the trajectory generation) level.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of selecting a route for a vehicle having an autonomous driving mode, the method comprising:
   identifying, by one or more processors, an initial location;
   using, by the one or more processors, the initial location to determine a set of possible routes to a destination location;
   determining, by the one or more processors, a cost for each route of the set of possible routes by:
      inputting time of day information, map information, and details of the route into one or more models,
      determining, by the one or more models based on the inputting, a first binary indication of whether the vehicle is likely to become stranded along the route for at least a predetermined amount of time without progressing along the route, wherein the first binary indication has a value of 1 when the vehicle is likely to become stranded, and the first binary indication has a value of 0 when the vehicle is not likely to become stranded, and
      assessing the cost based at least in part on the first binary indication;
   selecting, by the one or more processors, one of the routes of the set of possible routes based on one or more of the determined costs; and
   controlling, by the one or more processors, the vehicle in the autonomous driving mode using the selected one of the routes.

2. The method of claim 1, wherein the time of day information indicates whether the vehicle is currently in a high traffic time or a low traffic time.

3. The method of claim 1, wherein the vehicle is likely to become stranded along the route for at least the predetermined amount of time without progressing along the route due to at least one of yielding to traffic or an occlusion, waiting for a passenger during pickup or drop off, or stopping for a traffic light.

4. The method of claim 1, wherein inputting the time of day information, the map information, and the details of the route into the one or more models provides an indication whether the vehicle is likely to disengage from the autonomous driving mode, such that a driver must take control of the vehicle, along the route.

5. The method of claim 4, wherein the one or more models provide a second binary indication of whether the vehicle is likely to disengage along the route, and assessing the cost is further based on the second binary indication.

6. The method of claim 1, wherein the details of the route include an estimated duration for a lane change and determining the cost of the route further includes inputting the estimated duration for the lane change into the one or more models in order to determine whether the vehicle is likely to successfully complete the lane change, and wherein assessing the cost is further based on the determination of whether the vehicle is likely to successfully complete the lane change.

7. The method of claim 6, wherein the one or more models provide a second binary indication of whether the vehicle is likely to successfully complete the lane change, and assessing the cost is further based on the second binary indication.

8. The method of claim 1, wherein the details of the route include a turn at an intersection and determining the cost of the route further includes inputting a location of the turn into the one or more models in order to determine whether the turn is likely to be unprotected, and wherein assessing the cost is further based on the determination of whether the turn is likely to be unprotected.

9. The method of claim 8, wherein the one or more models provide a second binary indication of whether the turn will be protected or unprotected, and assessing the cost is further based on the second binary indication.

10. The method of claim 1, wherein the first binary indication has a value of 1 when the vehicle is likely to become stranded, and the first binary indication has a value of 0 when the vehicle is not likely to become stranded.

11. The method of claim 1, wherein the assessed cost is greater when the first binary indication has a value of 1 than when the first binary indication has a value of 0.

12. A system for selecting a route for a vehicle having an autonomous driving mode, the system comprising one or more processors configured to:
   identify a current location of the vehicle;
   use the current location of the vehicle to determine a set of possible routes to a destination location;
   determine a cost for each route of the set of possible routes by:
      inputting time of day information, map information, and details of the route into one or more models,
      determining, by the one or more models based on the inputting, a first binary indication of whether the vehicle is likely to become stranded along the route for at least a predetermined amount of time without progressing along the route, wherein the first binary indication has a value of 1 when the vehicle is likely to become stranded, and the first binary indication has a value of 0 when the vehicle is not likely to become stranded, and
      assessing the cost based at least in part on the first binary indication;
   select one of the routes of the set of possible routes based on one or more of the determined costs; and
   control the vehicle in the autonomous driving mode using the selected one of the routes.

13. The system of claim 12, wherein the first binary indication has a value of 1 when the vehicle is likely to become stranded and the first binary indication has a value of 0 when the vehicle is not likely to become stranded.

14. The system of claim 12, wherein the assessed cost is greater when the first binary indication has a value of 1 than when the first binary indication has a value of 0.

15. The system of claim 12, wherein the vehicle is likely to become stranded along the route for at least the predetermined amount of time without progressing along the route due to at least one of yielding to traffic or an occlusion, waiting for a passenger during pickup or drop off, or stopping for a traffic light.

16. The system of claim 12, wherein inputting the time of day information, the map information, and the details of the route into the one or more models provides an indication whether the vehicle is likely to disengage from the autonomous driving mode, such that a driver must take control of the vehicle, along the route.

17. The system of claim 16, wherein the one or more models provide a second binary indication of whether the vehicle is likely to disengage along the route, and the one or more processors are further configured to assess the cost further based on the second binary indication.

18. The system of claim 12, wherein the details of the route include an estimated duration for a lane change and the one or more processors are configured to determine the cost of the route by inputting the estimated duration into the one or more models in order to determine whether the vehicle is likely to successfully complete the lane change, and the one or more processors are configured to assess the cost further based on the determination of whether the vehicle is likely to successfully complete the lane change.

19. The system of claim 18, wherein the one or more models provide a second binary indication of whether the vehicle is likely to successfully complete the lane change, and the one or more processors are configured to assess the cost further based on the second binary indication.

20. The system of claim 12, wherein the details of the route include a turn at an intersection and the one or more processors are configured to determine the cost of the route by inputting a location of the turn into the one or more models in order to determine whether the turn is likely to be unprotected, and the one or more processors are configured to assess the cost further based on the determination of whether the turn is likely to be unprotected.

21. The system of claim 20, wherein the one or more models provide a second binary indication of whether the turn will be protected or unprotected, and the one or more processors are configured to assess the cost further based on the second binary indication.

22. A vehicle having an autonomous driving mode, the vehicle comprising one or more processors configured to:
   identify a current location of the vehicle;
   use the current location of the vehicle to determine a set of possible routes to a destination location;
   determine a cost for each route of the set of possible routes by:
      inputting time of day information, map information, and details of the route into one or more models,
      determining, by the one or more models based on the inputting, a first binary indication of whether the vehicle is likely to become stranded along the route for at least a predetermined amount of time without progressing along the route, wherein the first binary indication has a value of 1 when the vehicle is likely to become stranded, and the first binary indication has a value of 0 when the vehicle is not likely to become stranded, and
      assessing the cost based at least in part on the first binary indication;

select one of the routes of the set of possible routes based on one or more of the determined costs; and control the vehicle in the autonomous driving mode using the selected one of the routes.

* * * * *

UNITED STATES PATENT AND TRADEMARK OFFICE
CERTIFICATE OF CORRECTION

PATENT NO. : 12,111,170 B1
APPLICATION NO. : 16/436165
DATED : October 8, 2024
INVENTOR(S) : Ajay Joshi et al.

It is certified that error appears in the above-identified patent and that said Letters Patent is hereby corrected as shown below:

In the Claims

Claim 1, Column 20, Lines 40 through 44:
Now reads: "progressing along the route, wherein the first binary indication has a value of 1 when the vehicle is likely to become stranded, and the first binary indication has a value of 0 when the vehicle is not likely to become stranded, and" should read -- progressing along the route, and --

Claim 12, Column 21, Lines 50 through 54:
Now reads: "progressing along the route, wherein the first binary indication has a value of 1 when the vehicle is likely to become stranded, and the first binary indication has a value of 0 when the vehicle is not likely to become stranded, and" should read -- progressing along the route, and --

Claim 22, Column 22, Lines 61 through 65:
Now reads: "progressing along the route, wherein the first binary indication has a value of 1 when the vehicle is likely to become stranded, and the first binary indication has a value of 0 when the vehicle is not likely to become stranded, and" should read -- progressing along the route, and --

Signed and Sealed this
Tenth Day of December, 2024

Katherine Kelly Vidal
*Director of the United States Patent and Trademark Office*